United States Patent [19]

Cook et al.

[11] 4,136,935

[45] Jan. 30, 1979

[54] REAR PROJECTION VIEWER HAVING AUXILIARY VIEWING SCREEN

[75] Inventors: Gerald H. Cook, Lynnfield; William A. Holmes, Marblehead, both of Mass.

[73] Assignee: Polaroid Corporation, Cambridge, Mass.

[21] Appl. No.: 665,788

[22] Filed: Dec. 30, 1977

[51] Int. Cl.² ............................................. G03B 21/10
[52] U.S. Cl. .................................... 352/104; 352/133; 350/123; 353/72; 353/76
[58] Field of Search ....................... 352/104, 133, 242; 350/123; 353/72, 74, 76, 78

[56] References Cited

U.S. PATENT DOCUMENTS

| | | | |
|---|---|---|---|
| 3,791,725 | 2/1974 | Young | 352/129 |
| 3,834,798 | 9/1974 | Bundschuh | 352/104 |
| 3,865,475 | 2/1975 | Hardy et al. | 352/104 |

*Primary Examiner*—Monroe H. Hayes
*Attorney, Agent, or Firm*—Frederick A. Goettel, Jr.

[57] ABSTRACT

A rear projection viewer apparatus of the type wherein a projected image is projected towards a primary viewing screen forming the front of the viewer, the front viewing screen being removably located with respect to other portions of the viewer housing so that it may be removed from the path of the projected images. A second rear projection screen substantially smaller than the first screen is provided. The small screen and selected portions of the viewer housing are provided with complementary structure for selectively locating the second screen at an operative position substantially normal to the projection axis and at a location therealong substantially closer to the image projecting means than the first rear projection screen when it is in its operative position.

7 Claims, 4 Drawing Figures

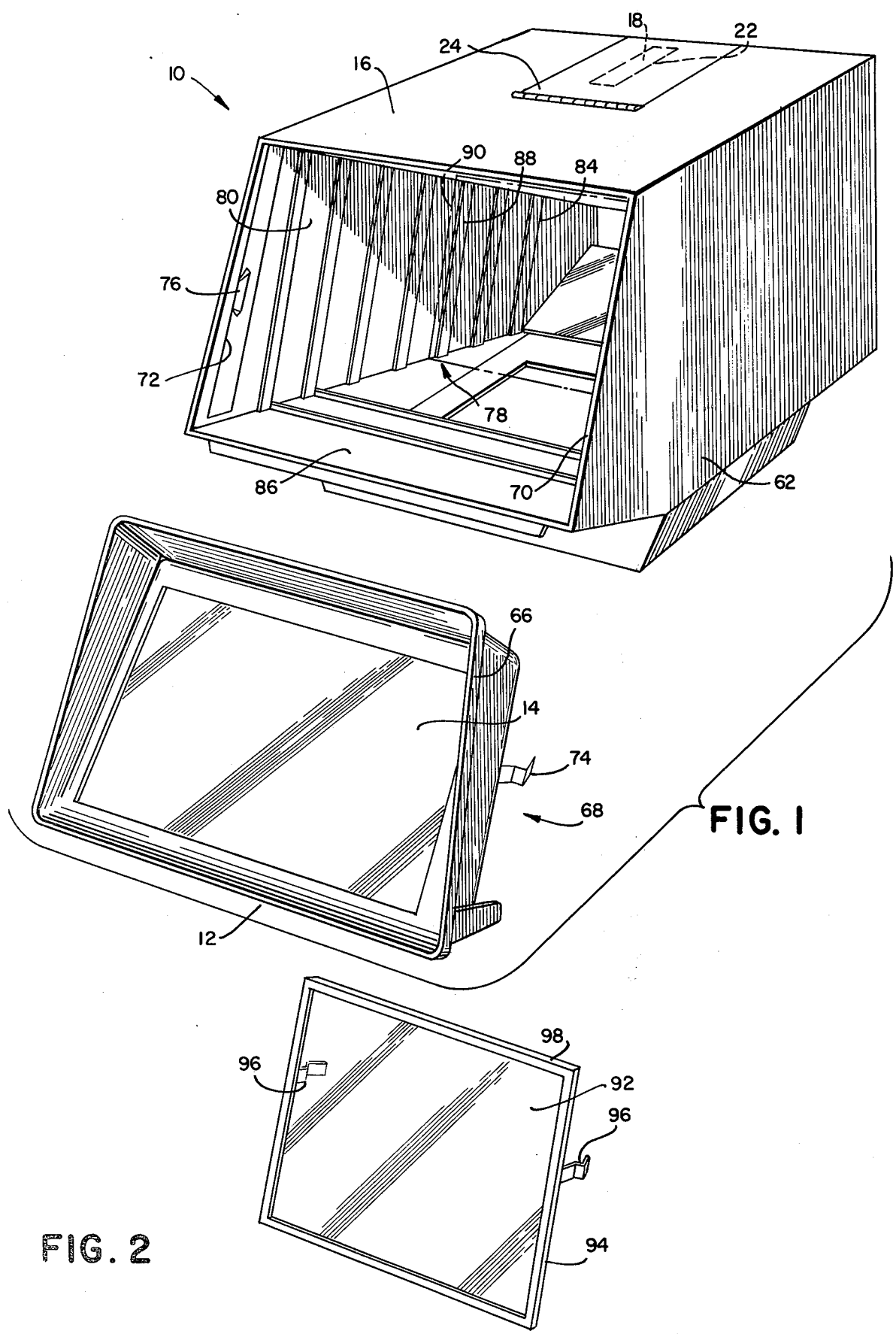

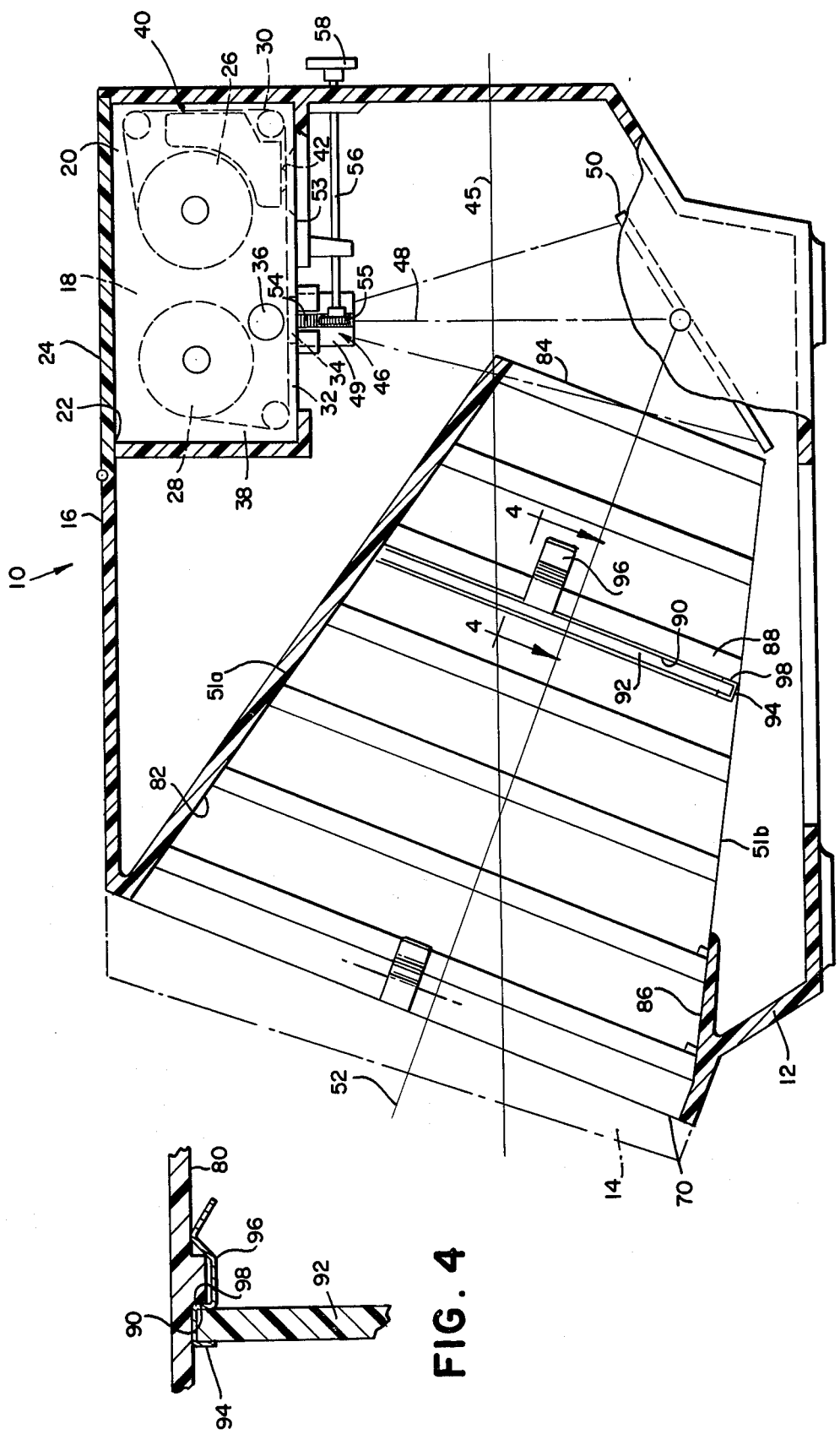

REAR PROJECTION VIEWER HAVING AUXILIARY VIEWING SCREEN

BACKGROUND OF THE INVENTION

1. Field of the Invention

This invention relates to photographic apparatus and, more particularly, to improved motion picture rear projection viewer apparatus.

2. Description of the Prior Art

Rear projection viewer apparatus in which the projection system and the viewing screen are combined in a single structural unit are well known in the prior art. Among other advantages, this type of viewer apparatus provides a compact portable unit which permits satisfactory pictorial displays in normal ambient light conditions, and is particularly suited to those instances where available space is limited.

A highly compact, rear projection viewer designed for operation with a motion picture film cassette is described in U.S. Pat. No. 3,701,127 entitled "Projector Apparatus" and assigned to the same assignee as the present invention. The viewer unit described in the above-cited patent provides a highly compact unit employing a lenticulated viewing screen which for reasons of compactness is inclined rearwardly over the base of the apparatus. Inasmuch as the viewing screen is inclined, a screen arrangement is provided which directs transmitted images over a given viewing zone, displaced from the axis perpendicular to the screen. Such a viewing screen is described in U.S. Pat. No. 3,848,980 entitled "Projector Apparatus and System Employing Unique Screen" also assigned to the same assignee as the present invention.

Under some conditions of extremely high ambient light conditions, for example, viewing outdoors on an extremely sunny, bright day, the image on the screen of such a viewer may not be sufficiently bright for good viewing of the images projected thereupon. Also, the viewer/projector of the above-cited patent may be equipped to operate in a portable manner from a 12 volt source such as, for example, through a cigarette lighter outlet in an automobile or a portable battery pack or the like. Under some circumstances, again with probable high ambient light conditions, as illumination available from the 12 volt system may not be sufficient to provide good, bright viewable images under the conditions described.

SUMMARY OF THE INVENTION

The present invention relates to a rear projection viewer apparatus of the type wherein an image is projected towards a primary viewing screen forming the front of the viewer. The front viewing screen is adapted to be removably located with respect to other portions of the viewer housing so that it may be removed from the path of the projected images. A second rear projection screen substantially smaller than the first screen is provided. The second smaller screen and selected portions of the viewer housing are provided with complementary structure for selectively locating the second screen at an operative position substantially normal to the projection axis and at a location therealong substantially closer to the image projecting means than the first rear projection screen when it is in its operative position. The first screen may be utilized to view the projected images under normal ambient lighting conditions and the second, smaller viewing screen may be utilized to view the projected images under substantially higher ambient lighting conditions.

In the preferred embodiment, the rear projection viewer is provided with a plurality of planar, interconnected wall sections disposed interiorly of the viewer housing and diverging outwardly therefrom. The wall sections cooperate to define an outwardly diverging structure with each wall extending substantially coincident to the outermost limit of the diverging image path as it is projected towards the front of the viewer. The second smaller rear projection screen and portions of the wall sections are provided with complementary structure whereby engagement of the structure of the second screen with the complementary structure of the wall sections serves to support the second smaller screen at an operative position wherein the projected image will substantially fill the smaller screen.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will be best understood from the following description of the preferred embodiment when read in connection with the accompanying drawings wherein:

FIG. 1 is a diagrammatic view, in perspective, of a motion picture viewer embodying the features of this invention illustrating the primary viewing screen removed therefrom and illustrating the location of the auxiliary smaller screen therein in phantom lines;

FIG. 2 is a view in perspective of an auxiliary viewing screen which may be installed in the viewer apparatus of FIG. 1;

FIG. 3 is a sectional side elevational view of a motion picture viewer embodying the features of this invention illustrating the screen of FIG. 2 installed therein; and FIG. 4 is a fragmentary view of the viewer taken along the line 4—4 of FIG. 3.

DESCRIPTION OF THE PREFERRED EMBODIMENT

As shown in FIGS. 1 and 3, the photographic apparatus of the present invention preferably takes the form of a rear projection viewer 10 comprising a box-like housing 12 defined in part by a front viewing screen 14. Positioned rearwardly of the screen 14, and in adjoining relation to the top surface 16 of the housing 12 is a cassette receiving well 18 which is adapted to receive a motion picture film cassette 20. The cassette receiving well 18 extends to and is in communication with an opening 22 in the top surface 16 of the housing 12. Pivotally mounted at the forward edge of the opening 22 is a door member 24 for controlling access to the cassette well 18. Hence, the door 24 is mounted for pivotal motion between a closed position, as shown in the drawings, blocking the opening 22, and an open position permitting insertion and removal of the cassette 20.

The cassette 20 is a multipurpose motion picture film cassette and may, for example, take the form of the cassette described in U.S. Pat. No. 3,608,455 entitled "System for Processing a Strip of Photographic Material," which is assigned to the assignee of the present invention and which cassette is designed for exposure, processing and projection without removal of its film from the cassette casing. Preferably, the cassette comprises a generally flat parallelepiped casing enclosing a pair of motion picture film spools 26 and 28 to which a motion picture film strip 30 is attached so as to be disposed for transport between one spool and the other in an arrangement wherein portions of the film are advanced across a film gate or opening 34 which facilitates projection of the film images in a manner to be subsequently described.

Means are also provided in the cassette 20 to permit entrance of suitable illumination and for redirecting such illumination in a downward direction through the film 30 and out of the opening 34. For example, in this embodiment, an opening or aperture 36 is provided in one side wall 38 which adjoins the lower edge 32 of the cassette 20, and a reflector element (not shown) such as a mirror or prism, is included within the cassette to redirect the light entering aperture 36, out of the projection station opening 34. Hence, an illumination means (not shown) for example a conventional projection lamp is mounted in the apparatus and in adjoining relation to the aperture 36 so as to suitably direct illumination into the cassette 20. It will therefore be appreciated that the cassette opening 34 serves, in part, to define an exposure station during a first transport of the film 30 thereacross and a projection station during subsequent passes of the film strip thereacross.

Carried within the cassette 20 is a processing station 40, such as described in the aforementioned U.S. patent, which includes a processor 41, designed for selective operation for distribution of an appropriate processing fluid (not shown) upon the film 30 during transport of the latter past the dispensing surface or processor nozzle 42, located near the bottom of the processor. In the preferred embodiment, the processor 41 is perpendicular to the plane of the projection station opening 34, and is intended for operation in an upright attitude which facilitates gravitational flow of its fluid to the lower dispensing nozzle 42. Consequently, the well 18 is adapted to locate the cassette 20 in the vertical plane with its projection edge 32 parallel to the longitudinal axis 45 of the viewer 10, and hence, in a horizontal plane.

Included within the housing 12 in adjoining relation to the cassette receiving well 18 are means (not shown) for driving spools 26 and 28 for advancing film 30 across the opening 34. For example, appropriate drive shafts (not shown) are adapted to engage the spools 26 and 28 and suitably rotate them, and a conventional claw arrangement (not shown) is adapted to engage film strip 30 in a conventional manner in the vicinity of the cassette opening 34 so as to progressively advance incremental sections of the film thereacross.

Mounted beneath the cassette receiving well 18 in alignment with the opening 34 is a lens assembly 46, adapted to project an image of the film presented at the opening 34 and focus it at a desired plane at a desired distance from the film 30. As illustrated in FIG. 3, the lens assembly 46 directs an image vertically downward along an optical axis designated as 48 to a reflective means such as a mirror 50, mounted in the path of the axis 48 and at an acute angle thereto so as to redirect the projected image forwardly in a diverging path defined by the light rays 51a, 51b, along an upwardly inclined axis 52 onto the rear of the screen 14. The screen 14 is preferably disposed normal to the axis 52 to reduce pictorial distortion and, as set forth in the above-cited U.S. Pat. No. 3,848,980 it is preferably provided with means for redirecting the viewing axis downwardly to partially offset the upward inclination of the axis 52.

Also included within the apparatus housing 12 are means for focusing the projected images on the screen 14. These means include an arrangement wherein the lens assembly 46 is displaceably mounted for movement along the optical path 48. For example, lens assembly 46 is slideably mounted in a sleeve 49 which is conventionally affixed to the bottom 53 of the well 18. A rack 54 is mounted on the lens assembly 46 and is engaged by a pinion gear 55 which is coupled, in turn, to a rod 56. The rod 56 extends through the rear wall 57 of the housing 12 to a focus adjusting know 58 so as to permit rotation of the knob 58 to alter the focus of the projected images to obtain the desired focus for viewing on the front surface of the viewing screen 14.

Referring now to FIG. 1, it will be seen that the front viewing screen 14 is mounted within a peripherally extending frame 66 which together with the screen 14 define substantially the entire front face of the viewer housing 12. The frame and viewing screen assembly 68 is designed to be removably received in the substantially rectangular opening 70 of the viewer housing 12. The screen frame 66 and the interior 72 of the lateral side walls of the housing defining the opening 70 are provided with complementary structure for removably mounting the screen assembly 68 within the opening 70 in the viewer housing. Accordingly, the screen frame assembly 68 may be selectively mounted in the viewer housing 12 for viewing of images projected upon the rear of the viewing screen 14 as described hereinabove or may be completely removed therefrom as is illustrated in FIG. 1. The screen frame assembly 68 may be designed to simply slide into or press fit into the opening 70 in the viewer housing 12 or alternately and preferably as illustrated in FIG. 1, may be provided with suitable spring clips 74 arranged to deflect and cam into retaining engagement with complementary ribs 76 provided in the interior side 62 of the lateral side walls 72.

Referring now to both FIGS. 1 and 3, there is provided in the interior of the viewer housing 12 a diverging cone-like structure 78 extending from the interior of the viewer adjacent the mirror 50 and extending outwardly to define in part, the rectangular opening 70 in the front of the housing 12. This diverging cone 78 is defined by a pair of diverging lateral side portions 80 and an upper portion 82 each of which extend fully from the open back end 84 of the cone 78 to the front of the viewer housing 12. A lower portion 86 of the cone 78 extends from the front of the housing opening 70 and only partially rearwardly leaving the cone substantially open at its bottom surface. Each of the side walls 80 and the upper wall 82 of the cone are provided with a plurality of rib-like elements 88 extending peripherally therearound on the interior surfaces thereof. These rib-like members 88 serve as baffles to reduce reflection of unwanted light rays which may originate within the projection system as is conventional in photographic apparatus. Each of the baffles 88 extends substantially perpendicular to the forwardly extending projection axis 52 and includes a forwardly facing surface portion 90.

According to the invention, an auxiliary viewing screen 92 smaller in size than the primary front viewing screen 14 is provided having dimensions such that it may be inserted into the viewing cone 78 of the viewer 10 to be supported by at least a three sided peripherally extending support surface defined by the forwardly facing surfaces 90 of the side baffles 88 of the viewer's interior cone. FIG. 2 illustrates such an auxiliary screen 92 having an outer perimeter frame 94 which is provided with a pair of spring-like clip members 96 which are adapted to cam outwardly upon being pressed into contact with one of the baffle elements 88 and to snap into restraining orientation, as illustrated in FIG. 4, with the inwardly facing surface 98 of the outer perimeter frame 94 of the auxiliary screen in confronting relation with the forwardly facing surfaces 90 of the baffles 88.

Accordingly, it should be appreciated that removal of the large screen frame assembly 68 from the viewer housing 12 and the insertion of the small auxiliary viewing screen 92 into the viewer cone 78, in the manner described hereinabove, will result in orientation of the small screen in a position whereby the projection system of the viewer 10 will project the entire image carried by the film at the projection station onto the back of the small rear viewing screen thereby permitting viewing of the entire image from a viewing zone forwardly of the viewer housing 12. The only adjustment that need be made is to properly focus the image upon the rear surface of the screen by adjustment of the focus adjusting knob 56 in a conventional manner. In addition to the smaller screen providing a brighter image than the large primary viewing screen 14 which it replaces, it should be appreciated that the viewing cone 78, which serves as the mounting section for the smaller screen, further serves to enhance image brightness by acting as a shielding hood for keeping ambient light from impinging on the screen and detracting from the image brightness. Removal of the small screen 92 and reinstallation of the large primary viewing screen 14 is similarly easily accomplished.

What is claimed is:

1. Photographic apparatus for projection of an image of given size recorded on transparent photographic film for viewing thereof, said apparatus comprising:
   a housing defined in part by a first rear projection screen, said first rear projection screen being removably located at an operative position with respect to the other portions of said housing;
   image projection means, including a projection lamp and lens, mounted within said housing for projecting the image onto said first screen in a diverging path at least in part along an axis substantially normal to said first screen with the image substantially filling the first screen when located at its said operative position;
   a second rear projection screen substantially smaller than said first screen, said second screen and selected sections of said other portions of said housing having complementary means formed thereon for selectively locating said second screen within said housing at an operative position substantially normal to said axis and at a location therealong substantially closer to said image projecting means than said first rear projection screen when it is at its said operative position; and
   means for selectively adjusting said lens to focus substantially the entire image on said second screen when said first screen is removed from said other portions of said housing and said second screen is disposed at its said operative position, whereby said first screen may be utilized to view the projected image under normal ambient lighting conditions and said second screen may be utilized to view the projected image under substantially higher ambient lighting conditions.

2. The apparatus of claim 1 wherein said complementary means formed on said housing comprises at least a pair of laterally spaced outwardly diverging interior wall portions extending substantially parallel to the outer lateral limits of said diverging path, each of said wall portions having at least one rib-like baffle thereupon extending substantially perpendicular to said axis, each of said baffles including a forwardly facing surface and wherein said complementary means formed on said second rear projection screen comprises portions of the rear surface of said second screen adapted to engage said forwardly facing surface of said baffles for supporting said second projection screen in its said operative position.

3. The apparatus of claim 2 wherein said second rear projection screen further includes framing elements mounted on at least the opposing lateral edges thereof, each of said framing elements carrying thereon a deflectable resilient means for retainably engaging said baffles when said second screen is in said operative position for holding said second screen in said operative position.

4. The apparatus of claim 1 wherein only one of said first rear projection screen and said second rear projection screen is operatively attached to said apparatus at any one time for viewing purposes.

5. Photographic apparatus for projection of an image of given size recorded on transparent photographic film for viewing thereof, said apparatus comprising:
   a housing;
   an open ended projection screen mounting section disposed within said housing, said screen mounting section having a first open end arranged interiorly of said housing and having at least three outwardly diverging wall portions terminating at a location defining a second substantially larger open end;
   a first rear projection screen, said first screen and selected portions of said screen mounting section having complementary means formed thereon for selectively and removably locating said first screen within said screen mounting section at an operative position adjacent said larger open end thereof;
   image projection means, including a projection lamp and lens, mounted within said housing for projecting the image in a diverging path within said screen mounting section and along an axis substantially normal to said first screen such that said image will substantially fill said first screen when said screen is located at its said operative position;
   a second rear projection screen substantially smaller than said first screen, said second screen and a selected portion of said screen mounting section having complementary means formed thereon for selectively locating said second screen within said screen mounting section at an operative position, substantially parallel to said first screen's operative position and, intermediate said larger and said smaller open ends of said section; and
   means for selectively adjusting said lens to focus substantially the entire image on said second screen when said first screen is removed from said housing section and said second screen is disposed at its operative position within said housing section, whereby said first screen may be utilized to view the projected image under normal ambient lighting conditions and said second screen may be utilized to view the projected image under substantially higher ambient lighting conditions.

6. Photographic apparatus for projection of an image recorded on transparent photographic film for viewing of the image, said apparatus comprising:

a housing defined in part by a front viewing face;

image projecting means mounted within said apparatus housing for projecting the image carried by the film towards said front face in a diverging path along an axis substantially normal to said front viewing face, said front face including a first removably mounted rear projection screen disposed substantially normal to said axis permitting viewing of said images from a viewing zone located forwardly of said apparatus;

a second viewing screen substantially smaller than said screen of said front face and adapted to be disposed in said apparatus housing in a position along said axis closer to said image projecting means and substantially normal to said axis;

means within said housing disposed outside of said diverging image path for supporting said second screen in said position closer to said image projecting means; and means for focusing said projected images upon said second viewing screen, whereby upon removal of said first removably mounted screen and placement of said second viewing screen in said means for supporting, said images may be viewed on said second smaller viewing screen from a second viewing zone located forwardly of said apparatus.

7. The apparatus of claim 1 wherein said apparatus housing further comprises at least a pair of laterally spaced outwardly diverging interior wall portions extending substantially parallel to the outer lateral limits of said diverging path, each of said wall portions having at least one baffle thereupon extending substantially perpendicular to said axis and disposed at a location along said axis intermediate said image projecting means and said rear projection screen, wherein said means for supporting said second screen comprises a forwardly facing surface of each of said baffles and means for holding said second screen in supporting contact with said forward facing surfaces.

* * * * *